W. S. MILLER.
DRAFT RIGGING.
APPLICATION FILED OCT. 5, 1908.
918,185.
Patented Apr. 13, 1909.
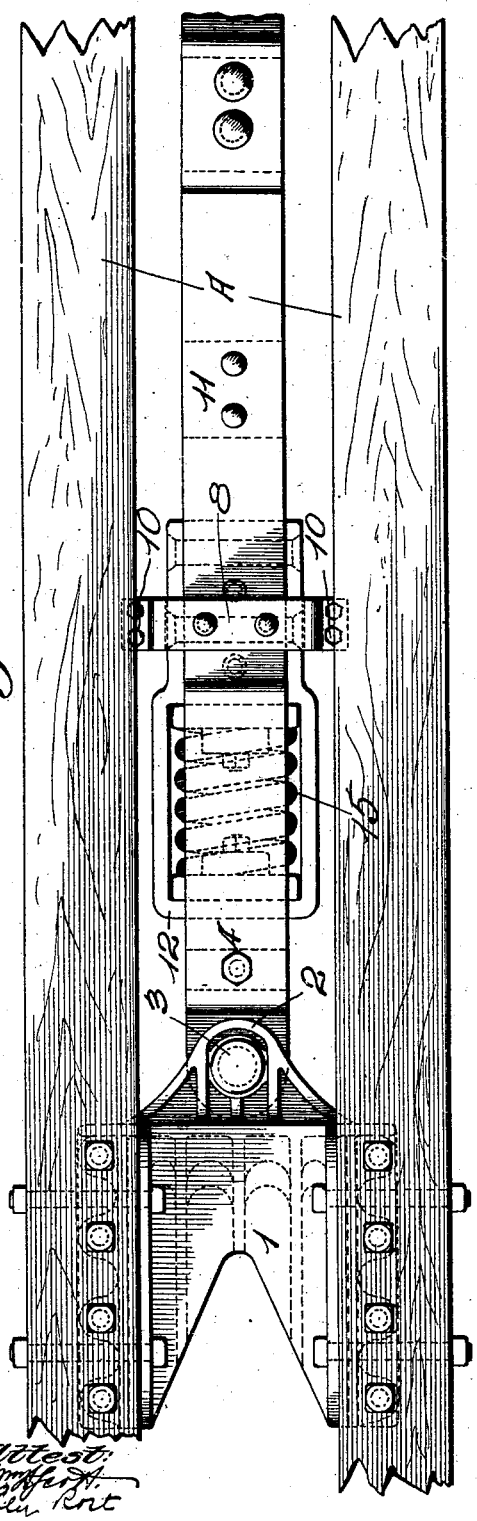
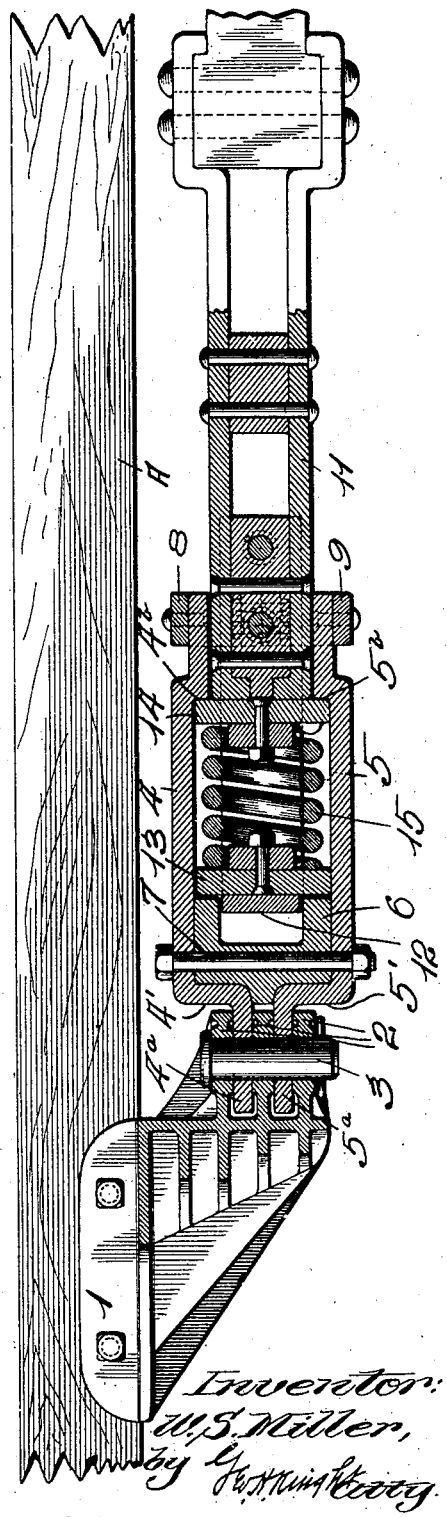

UNITED STATES PATENT OFFICE.

WALTER S. MILLER, OF ST. LOUIS, MISSOURI, ASSIGNOR TO ST. LOUIS CAR COMPANY, OF ST. LOUIS, MISSOURI, A CORPORATION.

DRAFT-RIGGING.

No. 918,185.  Specification of Letters Patent.  Patented April 13, 1909.

Application filed October 5, 1908. Serial No. 456,297.

*To all whom it may concern:*

Be it known that I, WALTER S. MILLER, a citizen of the United States of America, residing at the city of St. Louis, in the State of Missouri, have invented certain new and useful Improvements in Draft-Riggings, of which the following is a full, clear, and exact description, reference being had to the accompanying drawings, forming part of this specification.

My invention relates to a pivotally mounted or radiating draft rigging and it has for its object the production of a draft rigging of this description in which the parts are so constructed and assembled as to permit of ready separation of such parts when there is occasion for such separation.

Figure I is a top or plan view of my draft rigging. Fig. II is a vertical longitudinal section taken through the draft rigging.

In the accompanying drawings: A designates the center sills of a railway car.

1 designates a draft bracket that is suitably secured to the center sills A and is provided with three ears 2 at its forward end located one above another and adapted to receive a pivot pin 3.

4 and 5 designate respectively upper and lower draft plates that are provided at their rear ends with abutments 4' and 5' extending inwardly from the bodies of the plates and with rear arms 4ª and 5ª projecting from said abutment and interposed between the top and bottom pivot ears 2 and the central pivot ear 2 of the bracket 1. The arms 4ª and 5ª are provided with vertical pin-holes that receive the pivot pin 3 by which the plates are swingingly connected to the bracket 1. The bodies of the draft plates are held apart at their rear ends by a separating block 6 that is secured in position between the rear portions of the draft plates and against the abutments 4' and 5' of said plates by a bolt 7 that passes vertically through the plates and separating block. Near the forward ends of the bodies of the draft plates are shoulders 4ᵇ and 5ᵇ.

8 and 9 are respectively transverse upper and lower connecting bars that are suitably secured to the draft plates 4 and 5 preferably by means of rivets. The upper connecting bar 8 extends outwardly beyond the upper draft plate 4 and then downwardly and outwardly while the lower connecting bar extends outwardly beyond the lower draft plate 5 and then upwardly and outwardly so that its end portions face the ends of the connecting bar 8 above the connecting bar 9. The two connecting bars 8 and 9 are united by bolts 10 that pass vertically through the ends of the bars. It will be seen that by shaping the two connecting bars as explained, they are made of U-shape, the upper one being inverted and the lower one being uninverted and that, due to such shapes of the connecting bars and their attachment to each other by the bolts 10, they serve to hold the forward portions of the draft plates 4 and 5 separated from each other.

11 designates the body of a draw bar and 12 is the draw bar yoke secured to said body at its rear end.

13 and 14 are respectively rear and forward followers mounted within the draft plates 4 and 5 and the draw bar yoke, the former of said followers being arranged for abutment against the separating block 6 and the latter being arranged for abutment against the shoulders 4ᵇ and 5ᵇ of the draft plates 4 and 5.

15 is a draft and buffer spring interposed between the followers 13 and 14.

It will be readily perceived that the draw bar of my draft rigging may be readily separated from the remaining parts of the rigging, due to the use of removable fastening elements by which said parts are connected, thereby facilitating the making of repairs in the rigging when there is occasion therefor. To separate the draw bar from the other parts of the rigging, it is only necessary to withdraw the pivot pin 3 from the draft bracket 1 for the purpose of permitting the separation of the draft plates 4 and 5 from said bracket, after which, upon the removal of the bolt 7 connecting the draft plates and the bolts 10 uniting the transverse connecting bars 8 and 9, said draft plates may be separated from each other and from the draw bar and the other parts of the rigging located between the draft plates.

I claim:

1. In a draft rigging, the combination with a draw bar, a draft and buffing spring and followers, of a pair of separable draft plates adapted to receive said draw bar, spring and followers, and a pair of separable transverse connecting bars secured to said draft plates, substantially as set forth.

2. In a draft rigging, the combination with a draw bar, a draft and buffing spring and followers, of a pair of separable draft plates adapted to receive said draw bar, spring and followers, a separating block located between said draft plates at one end thereof, and a pair of transverse connecting bars attached to said draw plates at their other ends and separably connected to each other, substantially as set forth.

3. In a draft rigging, the combination with a draw bar, a draft and buffing spring, and followers, a pair of draft plates within which said draw bar, spring and followers are operable, a separating block located between said draft plates, a connecting bolt extending through said draft plates, and separating block, transverse connecting bars attached to said draft plates at their forward ends and projecting laterally beyond the sides of said plates, and connecting bolts mounted in the projecting ends of said connecting bars, substantially as set forth.

WALTER S. MILLER.

In presence of—
EDWARD H. GORSE,
A. DIEKMANN.